United States Patent
Kinoshita et al.

(10) Patent No.: US 12,274,192 B2
(45) Date of Patent: Apr. 15, 2025

(54) COMMUNICATION SYSTEM FOR AGRICULTURAL MACHINE

(71) Applicant: KUBOTA CORPORATION, Osaka (JP)

(72) Inventors: Tomohiro Kinoshita, Sakai (JP); Takanori Morimoto, Sakai (JP); Shinnosuke Ishikawa, Sakai (JP)

(73) Assignee: KUBOTA CORPORATION, Osaka (JP)

(*) Notice: Subject to any disclaimer, the term of this patent is extended or adjusted under 35 U.S.C. 154(b) by 101 days.

(21) Appl. No.: 18/202,325

(22) Filed: May 26, 2023

(65) Prior Publication Data
US 2023/0320247 A1     Oct. 12, 2023

Related U.S. Application Data

(63) Continuation of application No. PCT/JP2021/048159, filed on Dec. 24, 2021.

(30) Foreign Application Priority Data

Dec. 29, 2020 (JP) ................ 2020-219875

(51) Int. Cl.
*A01B 69/00* (2006.01)
*A01B 69/04* (2006.01)
(Continued)

(52) U.S. Cl.
CPC ......... *A01B 69/008* (2013.01); *G05D 1/0276* (2013.01); *B64U 2101/20* (2023.01)

(58) Field of Classification Search
CPC ............. A01B 69/008; B64U 2101/20; B64U 2101/40; G05D 1/0276; G05D 1/2235;
(Continued)

(56) References Cited

U.S. PATENT DOCUMENTS

| | | | |
|---|---|---|---|
| 2018/0325014 A1 | 11/2018 | Debbaut | |
| 2019/0100309 A1 | 4/2019 | Flood et al. | |
| 2022/0269278 A1* | 8/2022 | Nishii | .......... G05D 1/648 |

FOREIGN PATENT DOCUMENTS

| | | |
|---|---|---|
| JP | 2019-40514 A | 3/2019 |
| JP | 2019-41593 A | 3/2019 |
| WO | 2020/183906 A1 | 9/2020 |

OTHER PUBLICATIONS

English Translation of the Written Opinion of the International Searching Authority for PCT/JP2021/048159, recorded into prosecution history on Jun. 2023, retrieved from https://patentscope.wipo.int/search/en/detail.jsf?docId=WO2022145358 (Year: 2023).*

(Continued)

*Primary Examiner* — Calvin Cheung
(74) *Attorney, Agent, or Firm* — Keating & Bennett, LLP

(57) ABSTRACT

A communication system for an agricultural machine includes an information terminal to transmit first information to an agricultural machine, a first communicator provided in or on an unmanned aerial vehicle to receive the first information transmitted from the information terminal, and a second communicator provided in or on the agricultural machine to receive the first information transmitted to the first communicator. The second communicator is operable to transmit second information about the agricultural machine to the first communicator, and the first communicator is operable to transmit the second information to the information terminal.

8 Claims, 13 Drawing Sheets

(51) Int. Cl.
   *G05D 1/00*     (2006.01)
   *B64U 101/20*   (2023.01)
(58) Field of Classification Search
   CPC ........ G05D 1/226; G05D 1/247; G05D 1/648;
                G05D 1/692; G05D 2105/15; G05D
            2105/40; G05D 2107/21; G05D 2109/10;
                        G05D 2109/254; G05D 2111/30
   See application file for complete search history.

(56) References Cited

OTHER PUBLICATIONS

JP 2019040514 with English translation; publication date: Mar. 14, 2019. (Year: 2019).*
WO 2019041633 with English translation; date filed: Dec. 13, 2017; date published Jul. 3, 2019. (Year: 2019).*
Official Communication issued in International Patent Application No. PCT/JP2021/048159, mailed on Mar. 22, 2022.
Official Communication issued in corresponding European Patent Application No. 21915218.8, mailed on Oct. 16, 2024, 7 pages.

* cited by examiner

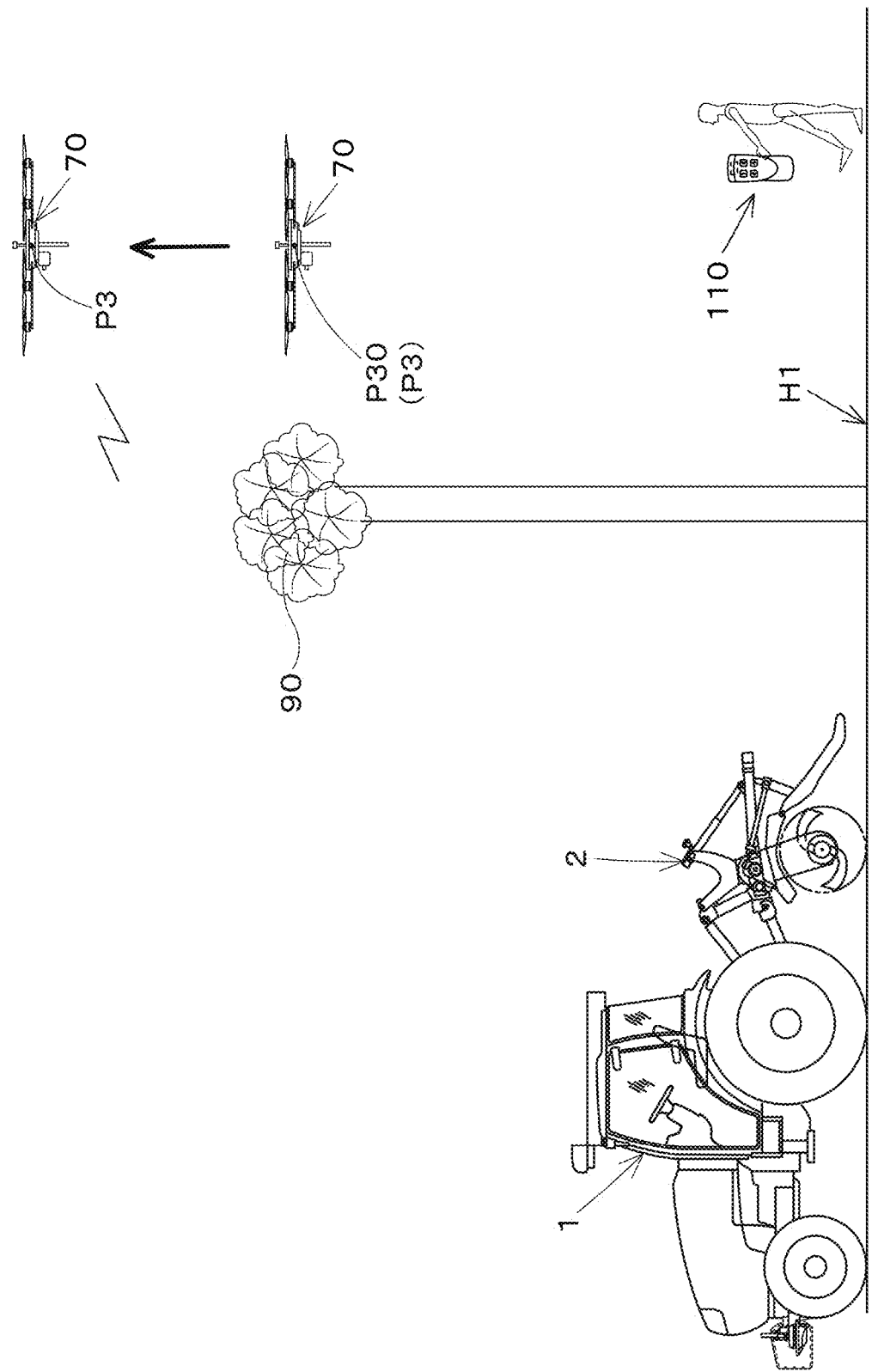

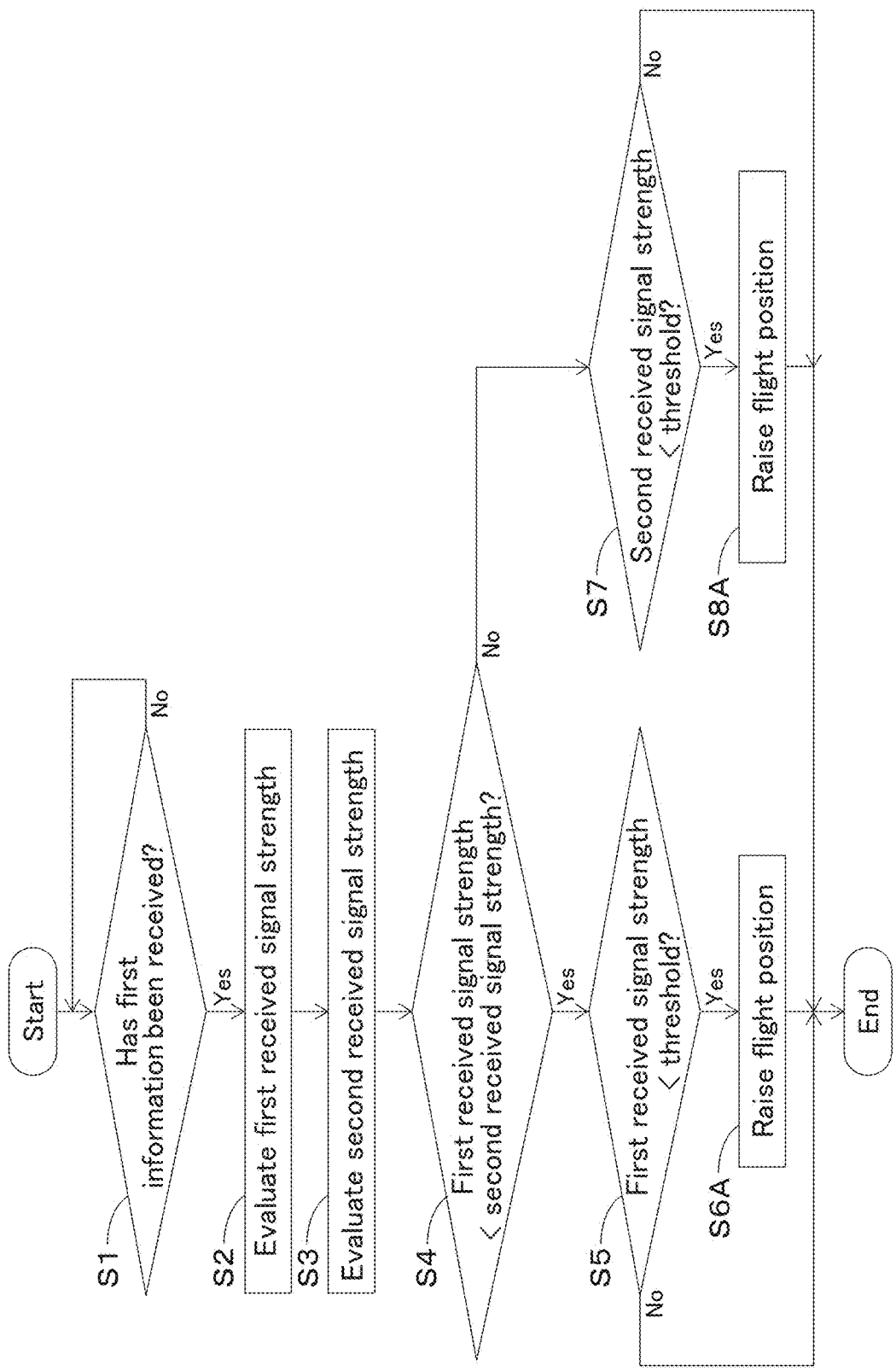

COMMUNICATION SYSTEM FOR AGRICULTURAL MACHINE

CROSS REFERENCE TO RELATED APPLICATIONS

This application is a continuation application of International Application No. PCT/JP2021/048159, filed on Dec. 24, 2021, which claims the benefit of priority to Japanese Patent Application No. 2020-219875, filed on Dec. 29, 2020. The entire contents of each of these applications are hereby incorporated herein by reference.

BACKGROUND OF THE INVENTION

1. Field of the Invention

The present invention relates to a communication system for an agricultural machine such as a tractor, a combine, a rice transplanter, or the like.

2. Description of the Related Art

Japanese Unexamined Patent Application Publication No. 2019-41593 is known as a technology for communication between an agricultural machine and a portable terminal. Japanese Unexamined Patent Application Publication No. 2019-41593 discloses a controller including a control unit capable of controlling automatic travel of a working machine that is capable of traveling and a stopper to stop automatic travel control related to automatic travel controlled by the control unit, a communicator connected to the controller and communicable with the outside, and a portable terminal to transmit a release signal, for releasing stop of automatic travel control, to the communicator. The portable terminal includes a plurality of switches and a communication unit to transmit the release signal to the communicator when the plurality of switches are operated.

SUMMARY OF THE INVENTION

With Japanese Unexamined Patent Application Publication No. 2019-41593, it is possible to stop automatic travel control and to release stop of automatic travel control by using the portable terminal. However, depending on the situation of the agricultural machine and the portable terminal information transmitted from the portable terminal may not reach the agricultural machine.

Preferred embodiments of the present invention provide communication systems for agricultural machines, each improving communication between an agricultural machine and an information terminal.

A communication system for an agricultural machine includes an information terminal to transmit first information to an agricultural machine, a first communicator provided in or on an unmanned aerial vehicle to receive the first information transmitted from the information terminal, and a second communicator provided in or on the agricultural machine to receive the first information transmitted from the first communicator.

The second communicator may be operable to transmit second information about the agricultural machine to the first communicator. The first communicator may be operable to transmit the second information to the information terminal.

The unmanned aerial vehicle may be operable to move to a position that allows the unmanned aerial vehicle to transmit and receive the first information or the second information.

The unmanned aerial vehicle may be operable to move to a position that allows the unmanned aerial vehicle to transmit and receive the first information or the second information, based on a first received signal strength of the first information transmitted from the information terminal and a second received signal strength of the second information transmitted from the second communicator.

The information terminal may be operable to transmit, as the first information, information including instructing the agricultural machine to start traveling or instructing the agricultural machine to stop traveling.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 8B is a side view illustrating a state in which the unmanned aerial vehicle is flying in coordination (cooperation) with the tractor in a first variation.

FIG. 9B is a flowchart of a process through which the unmanned aerial vehicle relays information communication between the information terminal and the tractor in the first variation.

FIG. 9C is a flowchart of a process through which the unmanned aerial vehicle relays information communication between the information terminal and the tractor in a second variation.

DETAILED DESCRIPTION OF THE PREFERRED EMBODIMENTS

Figure 1:
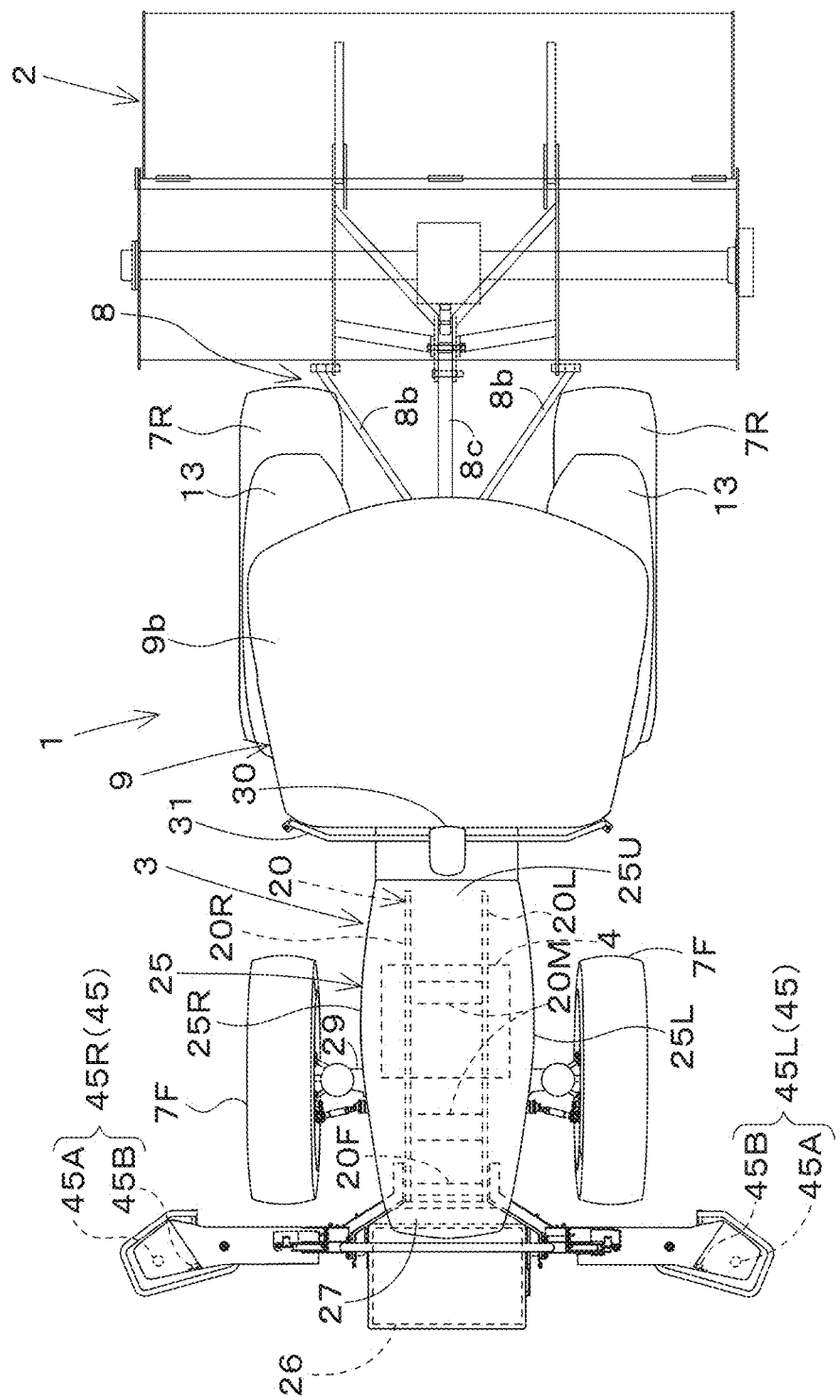
FIG. 1 is an overall plan view of a tractor.

The preferred embodiments will now be described with reference to the accompanying drawings, wherein like reference numerals designate corresponding or identical elements throughout the various drawings. The drawings are to be viewed in an orientation in which the reference numerals are viewed correctly.

Hereafter, preferred embodiments of the present invention will be described with reference to the drawings.

Figure 2:
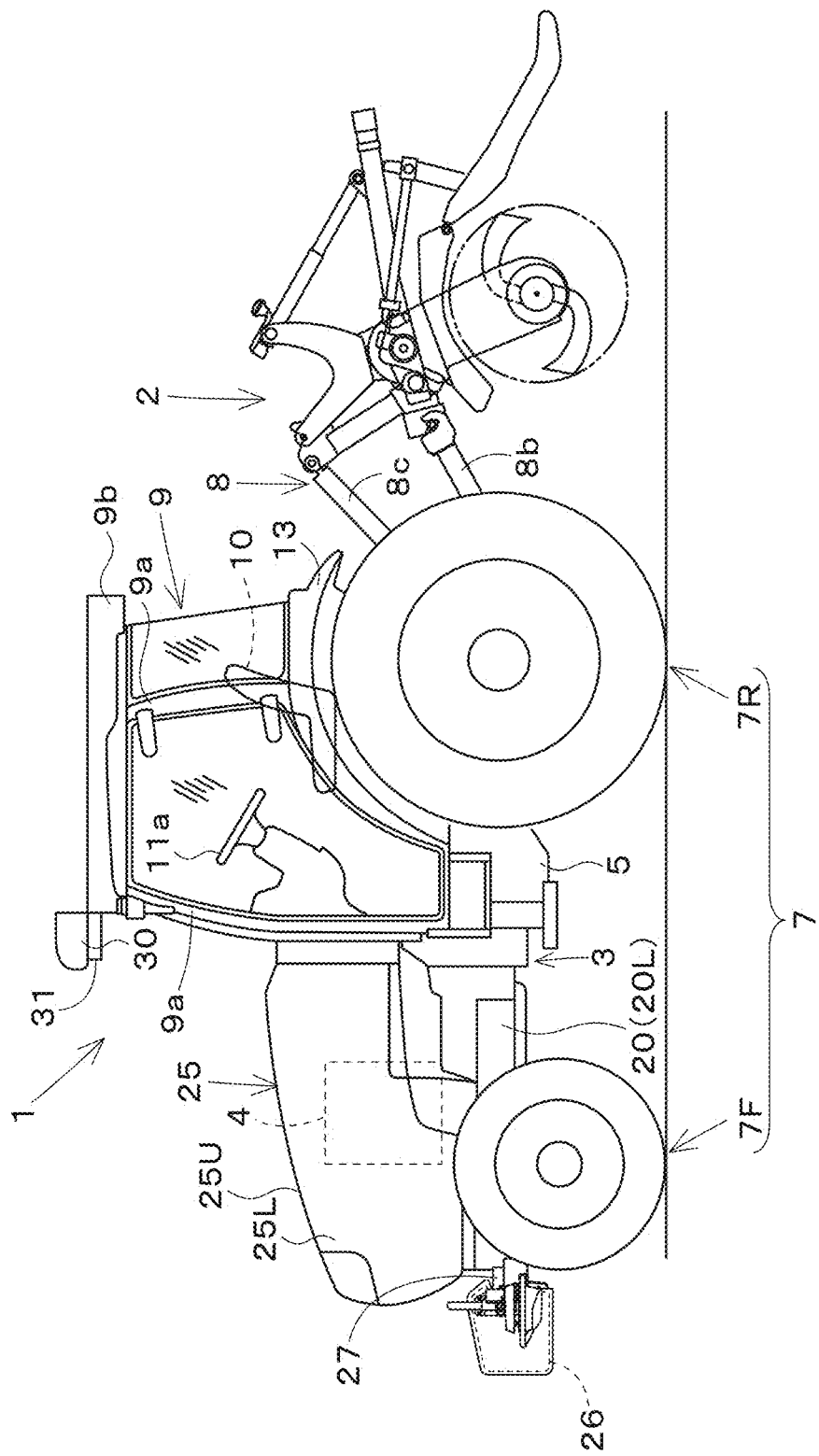
FIG. 2 is an overall side view of the tractor.

FIGS. 1 and 2 illustrate the entirety of an agricultural machine 1. The agricultural machine 1 is a tractor, a combine, a rice transplanter, or the like. Hereafter, the agricultural machine 1 will be described by using a tractor illustrated in FIGS. 1 and 2 as an example.

As illustrated in FIGS. 1 and 2, the tractor 1 includes a vehicle body (travel vehicle body) 3, a prime mover 4, and a transmission 5. A traveling device 7 is provided on the vehicle body 3. The traveling device 7 supports the vehicle body 3 such that the vehicle body 3 can travel and includes front wheels 7F and rear wheels 7R. The front wheels 7F and the rear wheels 7R, which are tires in the present preferred embodiment, may be crawlers. The prime mover 4 is an engine (diesel engine, gasoline engine), an electric motor, and/or the like. The transmission 5 can switch the propelling force of the traveling device by speed change, and can switch between forward movement and backward movement of the traveling device 7. An operator's seat 10 is provided on the vehicle body 3. The operator's seat 10 is protected by a protector 9. The protector 9 is a cabin that protects the operator's seat 10, a ROPS that protects the operator's seat 10 by covering the operator's seat 10 at least from above, or the like.

As illustrated in FIG. 2, the protector 9 includes a plurality of pillars 9a fixed to the vehicle body 3 and a roof 9b supported by the plurality of pillars 9a and disposed above the operator's seat 10. If the protector 9 is a cabin, a glass panel, a door, and the like are provided between the plurality of pillars 9a; and the operator's seat 10 is covered by the glass panel, the door, and the like. Fenders 13 are attached to a lower portion of the protector 9, and the fenders 13 cover upper portions of the rear wheels 7R.

As illustrated in FIG. 1, the vehicle body 3 includes a vehicle body frame 20. The vehicle body frame 20 includes a vehicle body frame 20L provided on the left side and a vehicle body frame 20R provided on the right side. The vehicle body frame 20L and the vehicle body frame 20R each extend forward from the transmission 5 and support a lower portion of the prime mover 4. The vehicle body frame 20L and the vehicle body frame 20R are separated in the vehicle-body width direction. A front end portion of the vehicle body frame 20L and a front end portion of the vehicle body frame 20R are coupled via a front coupling plate 20F. A middle portion of the vehicle body frame 20L and a middle portion of the vehicle body frame 20R are coupled via a middle coupling plate 20M. The vehicle body frame 20L and the vehicle body frame 20R support a front axle case 29. A front axle that rotatably supports the front wheel 7F is accommodated in the front axle case 29. That is, in the present preferred embodiment, the vehicle body frame 20 is a front axle frame that supports the front axle. The vehicle body frame 20 may be a frame that supports a structure other than the front axle case 29 (a frame other than the front axle frame).

As illustrated in FIGS. 1 and 2, a hood 25 is provided above the vehicle body frame 20. The hood 25 extends in the front-back direction along the vehicle body frame 20. The hood 25 is disposed forward of a middle portion of the protector 9 in the width direction. The hood 25 includes a left side wall 25L provided on the left side, a right side wall 25R provided on the right side, and an upper wall 25U that couples upper portions of the left side wall 25L and the right side wall 25R. An engine room is defined by the left side wall 25L, the right side wall 25R, and the upper wall 25U. The prime mover 4, a cooling fan, a radiator, a battery, and the like are accommodated in the engine room. The front wheels 7F are respectively disposed leftward of the left side wall 25L and rightward of the right side wall 25R.

A weight 26 is provided in front of the hood 25, that is, in front of the vehicle body frames 20L and 20R The weight 26 is attached to a weight bracket (weight attachment portion) 27 provided in a front portion of the vehicle body 3. The weight bracket 27 is attached to the front coupling plate 20F of the vehicle body frame 20L by using a fastener such as a bolt.

A coupler 8 is provided on a back portion of the vehicle body 3. The coupler 8 removably couples a working device (implement or the like) 2 to the vehicle body 3. The coupler 8 is a swinging drawbar that couples the working device 2 and the vehicle body 3 and does not perform raising/lowering, a raising/lowering device that includes a three-point linkage mechanism and the like and performs raising/lowering, or the like. The working device 2 is a cultivator that performs cultivation, a fertilizer spreader that spreads fertilizer, an agricultural chemical spreader that spreads an agricultural chemical, a harvester that performs harvesting, a lister that performs listing, a mower that cuts grass and the like, a tedder that spreads grass and the liker, a rake that gathers grass and the like, a baler that forms grass or the like into a bale, or the like.

Figure 3:
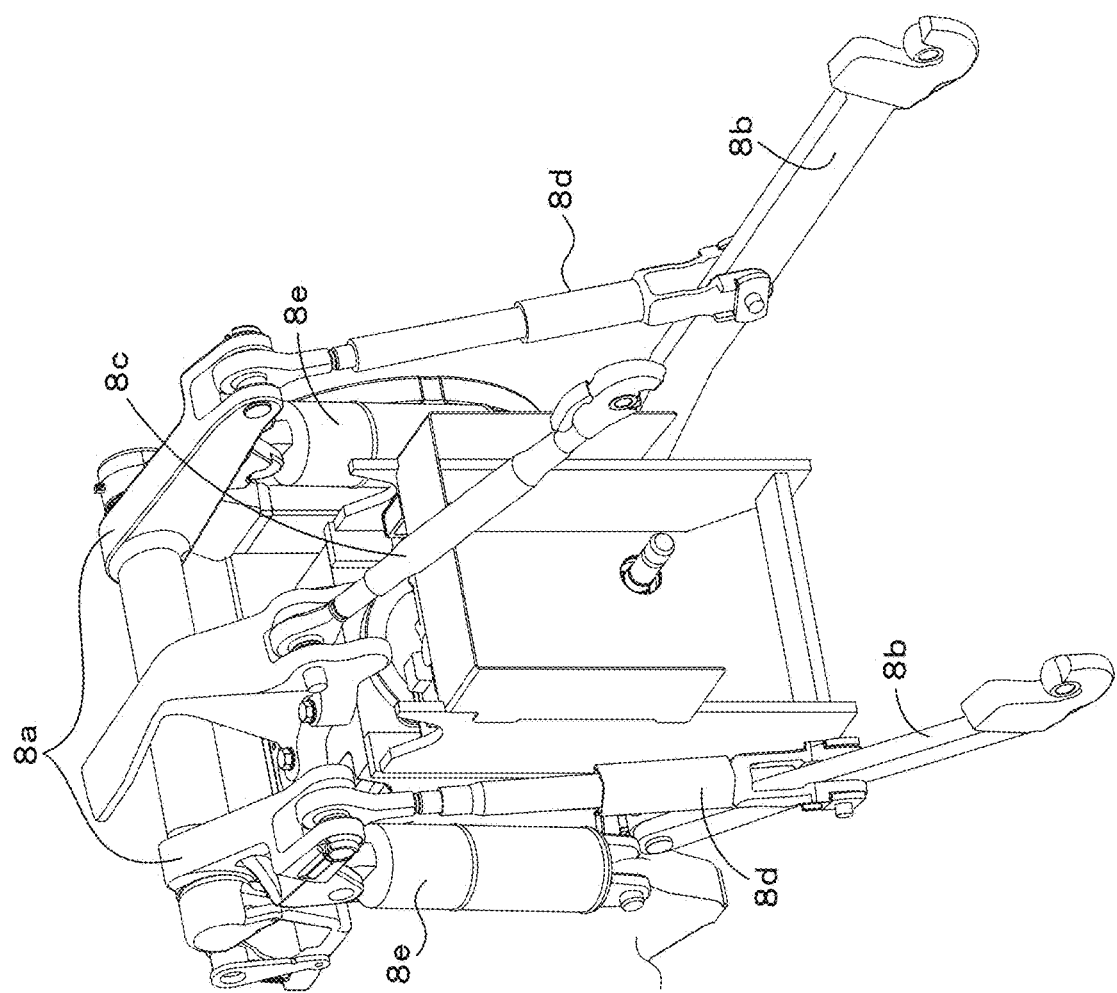
FIG. 3 is a perspective view of a raising/lowering device.

FIG. 3 illustrates the coupler 8 that is a raising/lowering device. As illustrated in FIG. 3, the coupler (raising/lowering device) 8 includes lift arms 8a, lower links 8b, a top link 8c, lift rods 8d, and lift cylinders 8e. Front end portions of the lift arms 8a are supported by upper back portions of a case (transmission case), which accommodates the transmission 5, so as to be swingable upward or downward. The lift arms 8a swing (are raised or lowered) by being driven by the lift cylinders 8e. The lift cylinders 8e are hydraulic pressure cylinders. The lift cylinders 8e are connected to a hydraulic pressure pump via a control valve 36. The control valve 36 is a solenoid valve or the like, and extends and contracts the lift cylinders 8e.

Front end portions of the lower link 8b are supported by lower back portions of the transmission 5 so as to be swingable upward or downward. A front end portion of the top link 8c is supported at a position above the lower links 8b by a back portion of the transmission 5 so as to be swingable upward or downward. The lift rods 8d couple the lift arms 8a and the lower links 8b. The working device 2 is coupled to back portions of the lower links 8b and a back portion of the top link 8c. When the lift cylinders 8e are driven (extend or contract), the lift arms 8a are raised or lowered, and the lower links 8b, which are coupled to the lift arms 8a via the lift rods 8d, are raised or lowered. Thus, the working device 2 swings upward or downward (is raised or lowered) with front portions of the lower link 8b as the fulcrum.

As illustrated in FIGS. 1 and 2, the tractor 1 includes a second position detector 30. The second position detector 30 is mounted forward of the roof 9b of the protector 9 via a mounter 31. However, the mounting position of the second position detector 30 is not limited to the position illustrated in the figures. The second position detector 30 may be mounted on the roof 9b of the protector 9 or on another portion of the vehicle body 3. The second position detector 30 may be mounted on the working device 2, which is a cultivator or the like as described above.

The second position detector 30 is a device that detects the position thereof (measured position including latitude and longitude) by using a satellite positioning system. That is, the second position detector 30 receives signals (positions of positioning satellites, transmission time, correction information, and the like) transmitted from the positioning satellites, and detects the position (latitude, longitude) based on the received signals. The second position detector 30 may detect, as the position (latitude, longitude) thereof, a corrected position that is corrected based on a correction signal and the like from a base station (reference station) that can receive signals from the positioning satellites. Alternatively, the second position detector 30 may have an inertial measurement unit such as a gyroscope sensor or an acceleration sensor, and may detect, as the position thereof, a position corrected by the inertial measurement unit. It is possible to detect the position (travel position) P1 of the vehicle body 3 of the tractor 1 by using the second position detector 30.

As illustrated in FIG. 1, the tractor 1 includes a plurality of obstacle detectors 45. Each of the plurality of obstacle detectors 45 can detect an object, that is, an obstacle 90 that is present around the tractor 1. At least one of the plurality of obstacle detectors 45 is provided forward of the protector 9 and outward of the hood 25. That is, in a region forward of the protector 9 of the tractor 1, at least one obstacle detector 45 is disposed in a region farther leftward than the left side wall 25L of the hood 25 or in a region farther rightward than the right side wall 25R of the hood 25. In the present preferred embodiment, the plurality of obstacle detectors 45 include an obstacle detector 45L provided on the left side of the vehicle body 3 (on the left side of the hood 25) and an obstacle detector 45R provided on the right side of the vehicle body 3 (the right side of the hood 25).

The obstacle detector 45 is a laser scanner 45A, a sonar 45B, and the like. The laser scanner 45A detects an object (obstacle) 90 by emitting laser light as a detection wave. The laser scanner 45A detects the distance to the obstacle 90 based on the time from emission to receipt of laser light. The sonar 45B detects an object (obstacle) 90 by emitting a sound wave as a detection wave. The plurality of obstacle detectors 45 of the preferred embodiment described above need not be provided outward of the hood 25, and the dispositions and the like of the plurality of obstacle detectors 45 are not limited.

Figure 4:
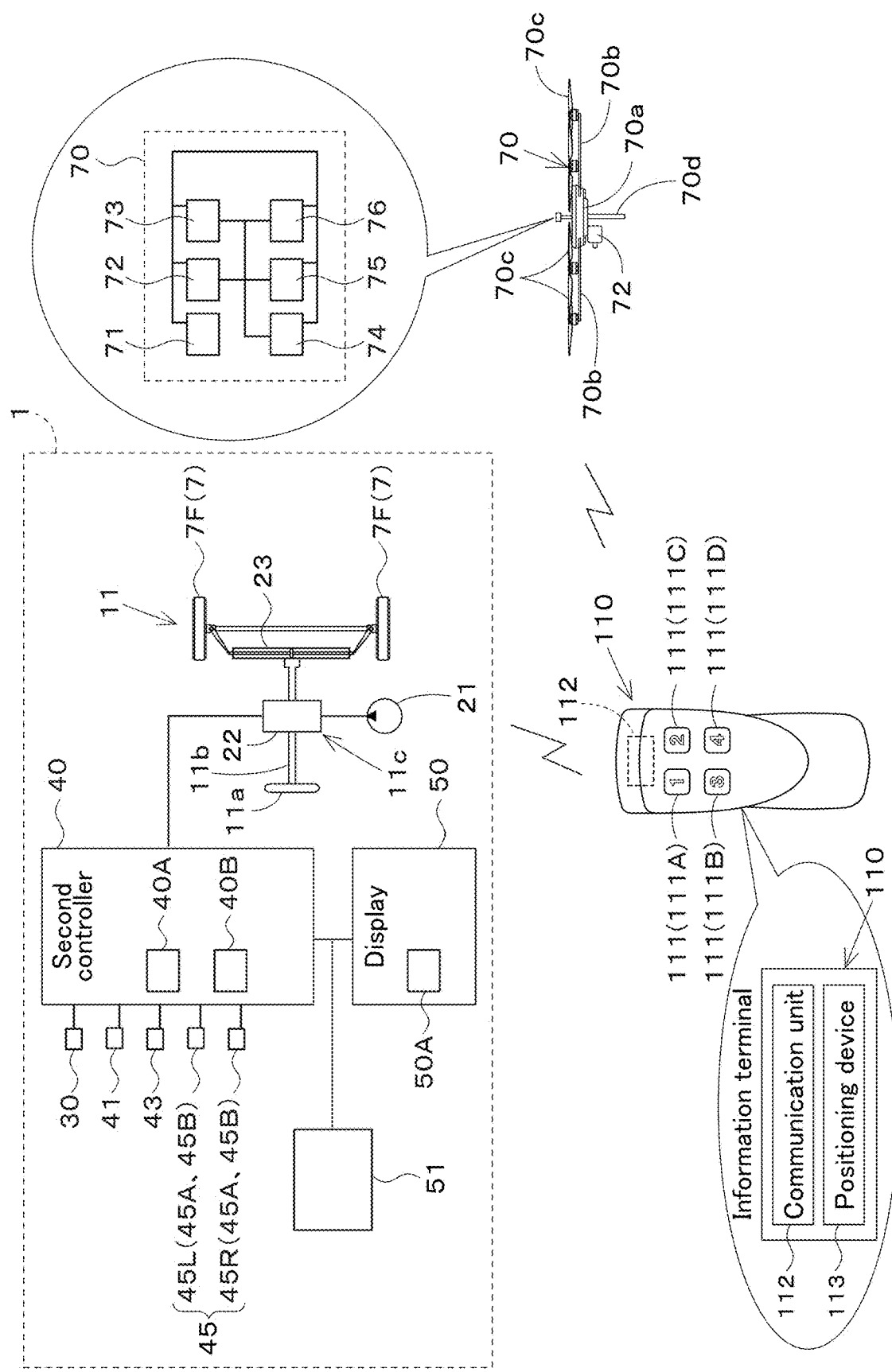
FIG. 4 is a control block diagram of a communication system for an agricultural machine.

As illustrated in FIG. 4, the tractor 1 includes a steering device 11. FIG. 4 is a control block diagram of a communication system for an agricultural machine. The steering device 11 includes a steering wheel 11a, a rotary shaft (steering shaft) 11b that rotates as the steering wheel 11a rotates, and an assist mechanism (power steering mechanism) 11c that assists in steering of the steering wheel 11a. The assist mechanism 11c includes a hydraulic pump 21, a control valve 22 to which a hydraulic fluid delivered from the hydraulic pump 21 is supplied, and a steering cylinder 23 that is activated by the control valve 22. The control valve 22 is a solenoid valve that is activated based on a control signal. The control valve 22 is, for example, a three-position switching valve that is switchable by movement of a spool or the like. The control valve 22 is switchable also by steering of the steering shaft 11b. The steering cylinder 23 is connected to arms (knuckle arms) that change the orientation of the front wheels 7F.

Accordingly, when the steering wheel 11a is operated, the switching position and the opening of the control valve 22 are switched in accordance with the steering wheel 11a, the steering cylinder 23 extends leftward or rightward in accordance with the switching position and the opening of the control valve 22, and thus the steering direction of the front wheels 7F can be changed. The steering device 11 described above is an example, and the configuration of the steering device 11 is not limited to the configuration described above.

As illustrated in FIG. 4, the tractor 1 includes a second controller 40, a display 50, and a communicator (second communicator) 51. In other words, the communication system for an agricultural machine includes the communicator (second communicator) 51 provided in or on the tractor 1. The second controller 40 includes a CPU, electric circuit(s), electronic circuit(s), and/or the like, and performs various control operations for the tractor 1. The display 50 includes a liquid crystal panel, an organic EL panel, and/or the like, and displays information of various types. The second communicator 51 is a device that performs external communication. The second communicator 51 is a communicator (communication module) that performs either direct communication or indirect communication with external apparatuses. The second communicator 51 can perform wireless communication in compliance with a communication protocol such as IEEE 802.11 series Wi-Fi (Wireless Fidelity, registered trademark), BLE (Bluetooth (registered trademark) Low Energy), LPWA (Low Power, Wide Area), LPWAN (Low-Power Wide-Area Network), or the like. Alternatively or additionally, the second communicator 51 may be a communicator (communication module) that performs wireless communication via a mobile-phone communication network, a data communication network, or the like.

As illustrated in FIG. 4, the second controller 40 controls the travel system and the working system of the tractor 1. The second controller 40 includes a travel controller 40A and a raising/lowering controller 40B. The travel controller 40A and the raising/lowering controller 40B include electric/electronic circuit(s) provided in the second controller 40, program(s) stored in the second controller 40, and/or the like.

Figure 5:
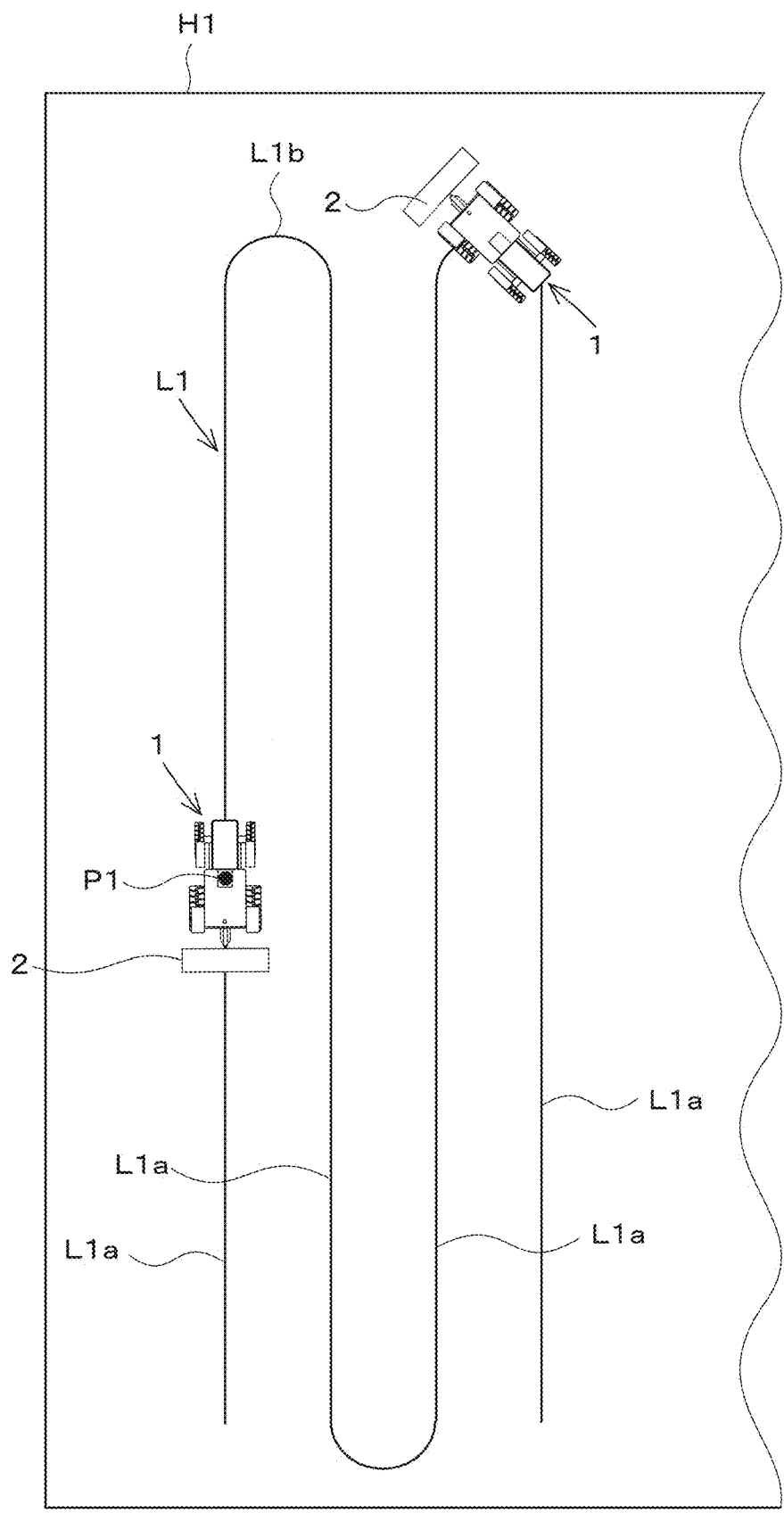
FIG. 5 illustrates automatic travel of the tractor.

As illustrated in FIG. 5, the travel controller 40A performs automatic travel control. FIG. 5 illustrates automatic travel of the tractor 1. In automatic travel control, the travel controller 40A sets the switching position and the opening of the control valve 22 so that at least the position (position detected by the second position detector 30) P1 of the vehicle body 3 which is traveling (hereinafter may be referred to as "travel position") matches a predetermined planned travel line (travel path) L1. In other words, the second controller 40 sets the movement direction and the movement amount of the steering cylinder 23 (the steering direction and the steering angle of the front wheels 7F) so that the travel position of the tractor 1 matches the planned travel line L1.

To be specific, the travel controller 40A compares the travel position P1 of the vehicle body 3 with the planned travel line L1. If the travel position P1 matches the planned travel position, the travel controller 40A does not change and maintains the angle and direction of steering performed using the steering wheel 11a of the steering device 11 (the steering angle and the steering direction of the front wheels 7F) (does not change and maintains the opening and the switching position of the control valve 22). If the travel position P1 does not match the planned travel line L1, the travel controller 40A changes the angle and/or the direction of steering performed using the steering wheel 11a of the steering device 11 (changes the opening and/or the switching position of the control valve 22) so that the deviation (displacement) of the travel position P1 from the planned travel line L1 is zero.

In the preferred embodiment described above, in automatic travel control, the travel controller 40A changes the angle of steering performed using the steering device 11 based on the deviation of the travel position P1 from the planned travel line L1. If the orientation of the planned travel line L1 differs from the orientation (vehicle-body orientation) of the movement direction (travel direction) of the tractor 1 (the vehicle body 3), the travel controller 40A may set the angle of steering so that the vehicle-body orientation matches the orientation of the planned travel line L1. In automatic travel control, the travel controller 40A may set the final angle of steering in automatic travel control based on an angle of steering obtained based on the deviation (positional deviation) and an angle of steering obtained based on an orientational deviation. The angle of steering may be set by using a method different from the aforementioned method of setting the angle of steering in automatic travel control.

In automatic travel control, the travel controller 40A may control the rotation speed of the traveling device 7, that is, the front wheels 7F and/or the rear wheels 7R so that the actual vehicle speed of the tractor 1 (the vehicle body 3) matches a vehicle speed corresponding to a predetermined planned travel line L1.

The travel controller 40A controls automatic travel based on the detection result of detecting an obstacle by the obstacle detector 45. For example, the travel controller 40A continues automatic travel when the obstacle detector 45 is not detecting an obstacle 90, and stops automatic travel when the obstacle detector 45 detects the obstacle 90. To be more specific, when the obstacle detector 45 detects the obstacle 90, the travel controller 40A stops automatic travel by stopping travel of the tractor 1 if the distance between the obstacle 90 and the tractor 1 is less than or equal to a predetermined threshold (stop threshold).

In the preferred embodiment described above, the travel controller 40A stops travel of the tractor if the distance between the obstacle 90 and the tractor 1 is less than or equal to the predetermined threshold (stop threshold). However, automatic travel may be performed so as to avoid the obstacle 90.

As illustrated in FIG. 4, a seat-occupation detector 43 that detects whether the operator's seat 10 is occupied by an operator is connected to the second controller 40. During automatic travel, the travel controller 40A continues automatic travel when the seat-occupation detector 43 is detecting that the operator's seat 10 is occupied and stops automatic travel when the seat-occupation detector 43 detects that the operator's seat 10 is not occupied.

The raising/lowering controller 40B performs raising/lowering control. When the manual raising/lowering function is effective and the raising/lowering operation member is operated in the raising direction (upward), the raising/lowering controller 40B extends the lift cylinders 8e by controlling a control valve 34 to raise back end portions (end portions adjacent to the working device 2) of the lift arms 8a. With the raising/lowering control, when the manual raising/lowering function is effective and the raising/lowering operation member is operated in the lowering direction (downward), the raising/lowering controller 40B contracts the lift cylinders 8e by controlling the control valve 34 to lower the back end portions (end portions adjacent to the working device 2) of the lift arms 8a. When the working device 2 is raised by using the coupler (raising/lowering device) 8 and the position of the working device 2, that is, the angle of the lift arms 8a reaches an upper limit (upper limit height) that has been set by using a height setting dial, the raising operation using the coupler (raising/lowering device) 8 is stopped.

With the raising/lowering control, when the back-up function is effective and the vehicle body 3 moves backward, the lift cylinders 8e are extended by automatically controlling the control valve 34 to raise the back end portions (end portions adjacent to the working device 2) of the lift arms 8a. With the raising/lowering control, when the auto-up function is effective and the angle of steering performed using the steering device 11 becomes a predetermined angle or larger, the lift cylinders 8e are extended by automatically controlling the control valve 34 to raise the back end portions (end portions adjacent to the working device 2) of the lift arms 8a.

Figure 6:
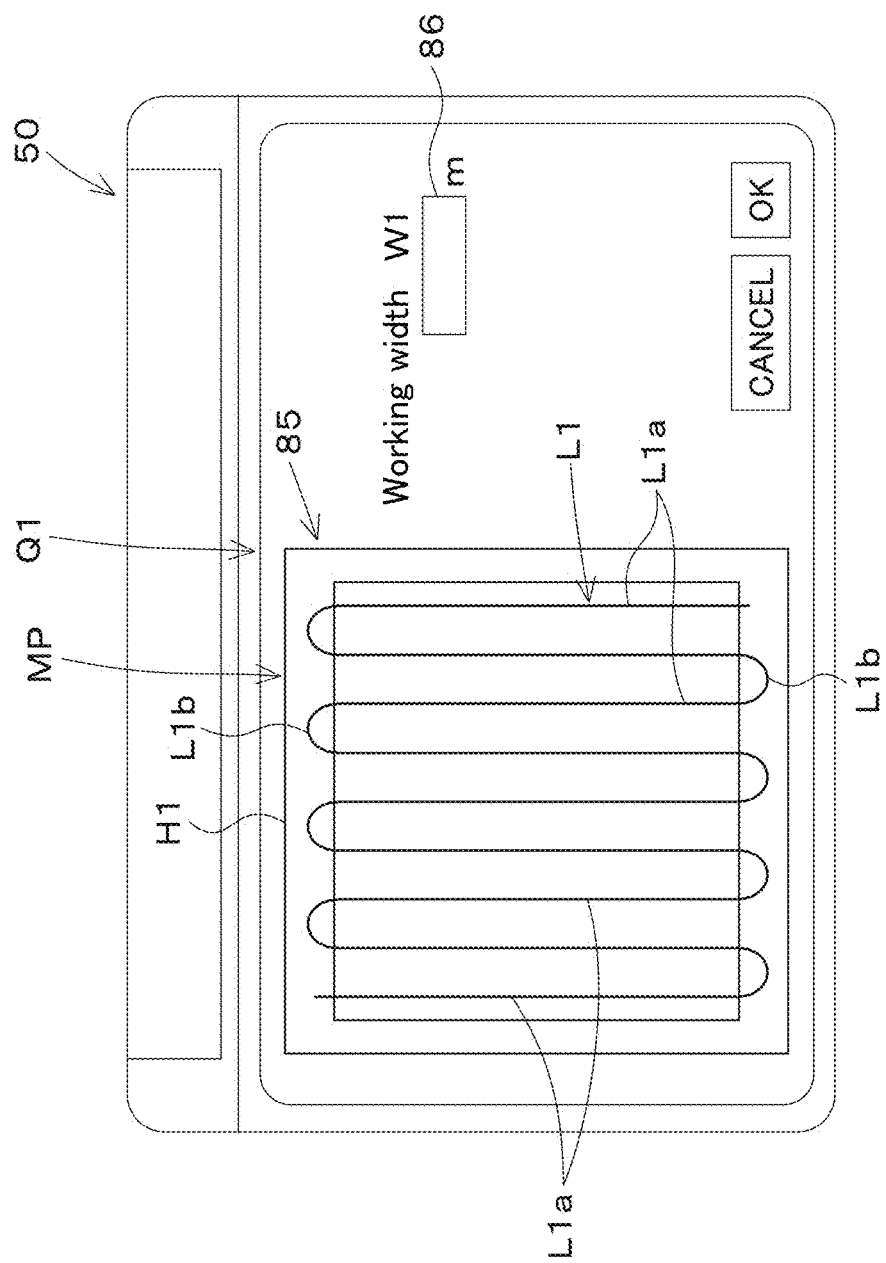
FIG. 6 illustrates a screen for creating a planned travel line L1.

The display 50 includes a line creator 50A. By referring to an agricultural field map MP registered beforehand on the display 50 or the like, the line creator 50A creates a travel line (planned travel line) L1 of the vehicle body 3 on the agricultural field map MP. As illustrated in FIG. 6, the line creator 50A displays a line setting screen Q1 on the display 50 when a predetermined operation is performed on the display 50. FIG. 6 illustrates the screen (line setting screen Q1) usable to create the planned travel line L1.

Figure 7A:
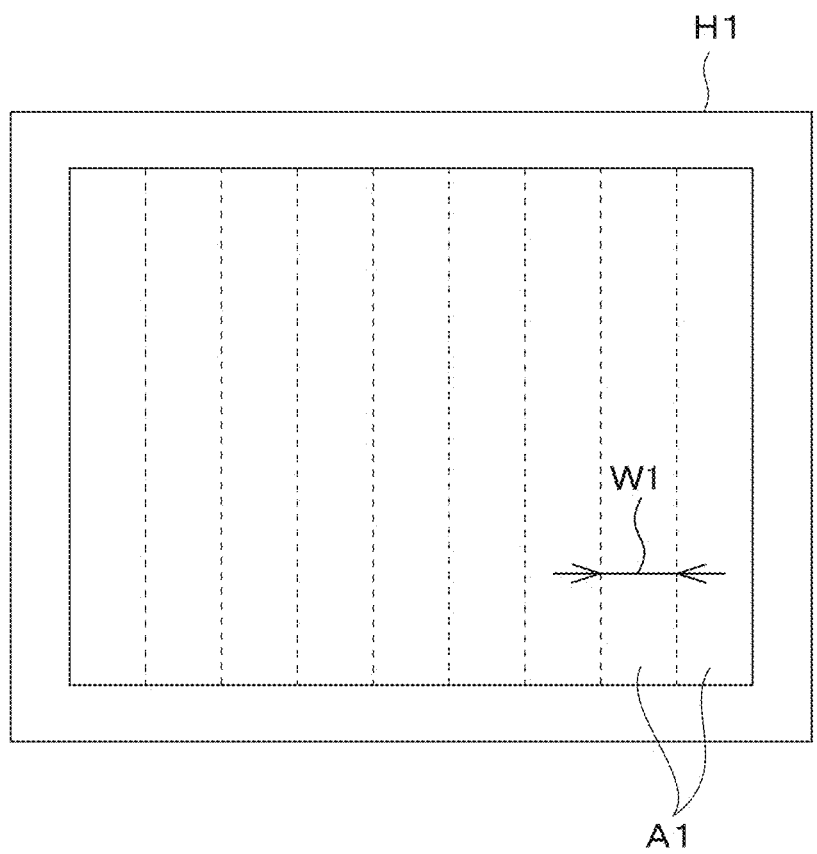
FIG. 7A illustrates an example of unit working zones A1.

The line setting screen Q1 includes a line display portion 85 to display the planned travel line L1 and a width input portion 86. FIG. 7A illustrates an example of unit working zones A1. As illustrated in FIG. 7A, when the width (working width) W1 of the working device 2 is input to the width input portion 86, the line creator 50A creates the plurality of unit working zones A1, in each of which the working device 2 will perform working, on the agricultural field map MP by dividing an agricultural field H1 on the agricultural field map MP in the vertical direction or in the horizontal direction. That is, the line creator 50A creates the plurality of unit working zones A1, each having the same width as the working width W1, on the agricultural field map MP.

Figure 7B:
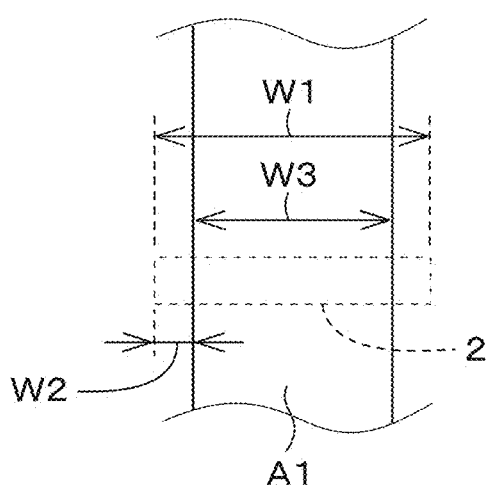
FIG. 7B illustrates a variation of a unit working zone A1.

As illustrated in FIG. 7B, the line creator 50A may create, on the agricultural field map MP, a plurality of unit working zones A1 each having a width W3 that is equal to the working width W1 minus an overlapping width W2. FIG. 7B illustrates a variation of the unit working zone A1. The overlapping width W2 can be input via the line setting screen Q1. That is, the line creator 50A sets, as the unit working zone A1, a minimum unit region in which the working device 2 performs working in the agricultural field H1 when the vehicle body 3, to which the working device 2 is coupled, is caused to travel.

The line creator 50A creates a straight travel portion (straight travel line) L1a, along which the vehicle body 3 travels straight, in each unit working zone A1 of the agricultural field map MP. That is, for example, the line creator 50A creates, in a middle portion in the width direction of the unit working zone A1, the straight travel portion L1a having a linear shape and connecting both end portions of the unit working zone A1 in the longitudinal direction. Moreover, the line creator 50A creates a turn portion (turn line) L1b along which the vehicle body 3 turns. That is, the line creator 50A creates the turn portion L1b by connecting end portions of adjacent straight travel portions L1a to each other in an arc shape.

As illustrated in FIG. 4, a state detector 41 to detect the driving state and the like of the tractor 1 is connected to the second controller 40. The second communicator 51 can transmit information detected by the state detector 41 as second information.

The state detector 41 is, for example, a device to detect the state of the travel system and detects, for example, the states of a crank sensor, a cam sensor, an engine rotation sensor, an accelerator sensor, a vehicle speed sensor, a steering angle sensor, the second position detector 30, activation/deactivation of automatic travel, and the like. The state detector 41 also includes devices to detect states other than the states of the travel system, such as a raising/lowering operation detection sensor to detect the operation amount, the operation direction, and the like of the raising/lowering operation member, a PTO rotation detection sensor, and the like.

The second information transmitted by the second communicator 51 includes, for example, information that the tractor 1 is continuing automatic travel or is stopping automatic travel. In the present preferred embodiment, the second information includes the travel position P1 detected by the second position detector 30. Therefore, the second communicator 51 can transmit the position of the tractor 1.

As illustrated in FIG. 4, the communication system for an agricultural machine includes an information terminal 110. The information terminal 110 is a terminal that can transmit information of various types (first information) to the tractor 1, that is, the communicator (the second communicator 51). The information terminal 110 is, for example, a terminal carried by an administrator or the like who monitors the tractor 1 and the like, and is a terminal that is easy to carry. The information terminal 110 is a remote control, a smartphone (multifunctional mobile phone), a tablet, or the like. In the present preferred embodiment, a remote control is used as the information terminal 110.

The information terminal 110 includes a plurality of switches 111. The plurality of switches 111 are switches that can switch between ON and OFF, and include a first switch 111A, a second switch 111B, a third switch 111C, and a fourth switch 111D. The first switch 111A is a switch that issues a command to start automatic travel. The second switch 111B is a switch that issues a command to interrupt automatic travel. The third switch 111C is a switch that issues a command to release a lock. The fourth switch 111D is a switch that issues a command for an emergency stop.

The information terminal 110 includes a communication unit (third communicator) 112. When at least one of the plurality of switches 111 is operated, the communication unit 112 can transmit information corresponding to the operated switch to the tractor 1 (communicator) 51. The communication unit 112 is, for example, a wireless device that emits an electromagnetic wave, and the communication unit 112 is accommodated in the housing of the remote control. The communication unit 112 can also receive information transmitted from the second communicator 51. That is, the information terminal 110 and the communication unit 112 can transmit information to and receive information from the tractor 1 and an unmanned aerial vehicle 70.

The communication unit 112 transmits a start signal to start automatic travel when the first switch 111A is operated from OFF to ON in a state in which the third switch 111C has been operated from OFF to ON (a state in which the third switch 111C is held ON), that is, in a state in which the third switch 111C has been operated to keep releasing the lock.

The communication unit 112 transmits an interruption signal to interrupt automatic travel when the second switch 111B is operated from OFF to ON. The communication unit 112 transmits a stop signal, to urgently stop the tractor 1, when the fourth switch 111D is operated from OFF to ON.

Accordingly, the communication unit 112 outputs the start signal, the interruption signal, and the urgent stop signal based on operations performed on the first switch 111A, the second switch 111B, the third switch 111C, and the fourth switch 111D. That is, the information terminal 110 transmits, as first information, an instruction for the tractor 1 to start automatic travel or an instruction for the tractor 1 to stop automatic travel.

That is, by using the information terminal 110, it is possible to transmit to the tractor 1 (the second communicator 51) information about control of the tractor 1 as the first information.

In addition to the configurations described above, the information terminal 110 may include a positioning device 113 that can detect the position thereof (terminal position P2). In such a case, the first information transmitted by the communication unit 112 includes information about the terminal position P2, and the information terminal 110 can transmit the position thereof (the terminal position P2).

As illustrated in FIG. 4, the communication system for an agricultural machine includes a communicator (first communicator) 75 provided in or on the unmanned aerial vehicle (aerial vehicle) 70. The unmanned aerial vehicle 70 is, for example, a multicopter.

Hereafter, the unmanned aerial vehicle 70 will be described by using a multicopter as an example.

The unmanned aerial vehicle (multicopter) 70 includes a body 70a, arm(s) 70b provided on the body 70a, rotary wings 70c provided on the arms 70b, and skid(s) 70d provided on the body 70a. The rotary wings 70c are devices to generate lift for flying. The unmanned aerial vehicle 70 includes at least two, preferably at least four, rotary wings 70c. Each of the rotary wings 70c includes a rotor to provide a rotational force and a blade (propeller) that rotates by being driven by the rotor.

The unmanned aerial vehicle 70 includes an electrical storage 71, a sensor 72, a first position detector 73, a memory 74, the first communicator 75, and a first controller 76. The electrical storage 71 is a battery, a capacitor, or the like, and is a device for storing electricity. The electrical storage 71 is attached, for example, to the inside of the body 70a or to the body 70a.

The sensor 72, including a CCD camera, an infrared camera, and/or the like, is detachably provided on a lower portion of the body 70a or is provided on the body 70a via a bracket (not shown). The sensor 72 is swingable relative to the bracket in the vertical direction or the horizontal direction and can change a sensing direction. It is possible to control swing of the sensor 72 in the horizontal direction and the vertical direction by using the first controller 76. For example, in a case where the unmanned aerial vehicle 70 is operated by using a remote control, when the first controller 76 acquires via the first communicator 75 a control signal transmitted from the remote control, the first controller 76 swings the sensor 72 in the horizontal direction or the vertical direction in accordance with the acquired control signal.

For example, by causing the unmanned aerial vehicle 70 to fly over the agricultural field H1, it is possible to perform sensing of the agricultural field H1 by using the sensor 72. In a case where the sensor 72 is a CCD camera, for example, several tens or several hundreds of fragment images of the agricultural field H1 are obtained by capturing aerial images of the agricultural field H1 from a height of about 100 m above the agricultural field H1. The plurality of aerial images that have been captured, that is, the plurality of images (aerial images) captured by the sensor 72, are stored in the memory 74 of the unmanned aerial vehicle 70. It is possible to output the plurality of aerial images, which are stored in the memory 74 of the unmanned aerial vehicle 70, externally via the first communicator 75.

The first position detector 73 is a device to detect the position (measured position information including latitude and longitude) P3 thereof using the satellite positioning system as with the second position detector 30, and has a configuration similar to that of the second position detector 30. The position P3 detected by the first position detector 73 may be referred to as "flight position". It is possible to detect height information, that is, altitude, by using the first position detector 73.

The communicator (first communicator) 75 is a communicator (communication module) that performs either direct communication or indirect communication with external apparatus(es) such as the communicator of the tractor 1 (the second communicator 51), the information terminal 110, and/or the like. The first communicator 75 can perform wireless communication in compliance with a communication protocol such as IEEE 802.11 series Wi-Fi (Wireless Fidelity, registered trademark), BLE (Bluetooth (registered trademark) Low Energy), LPWA (Low Power, Wide Area), LPWAN (Low-Power Wide-Area Network), and/or the like. Alternatively, the first communicator 75 may be a communicator (communication module) that performs wireless communication via a mobile-phone communication network, a data communication network, and/or the like.

The first controller 76 is a device to control the rotary wings 70c, and includes a CPU and the like. In a case where the unmanned aerial vehicle 70 includes at least two rotary wings 70c, the first controller 76 causes the unmanned aerial vehicle 70 to move to the side where there is the blade of one of the rotary wings by outputting control signals to the rotors so that the rotation speed of the blade of the one of the rotary wings is lower than the rotation speed of the blade of the other rotary wing, and causes the unmanned aerial vehicle 70 to move to the side where there is the blade of the other rotary wing by outputting control signals to the rotors so that the rotation speed of the blade of the other rotary wing is lower than the rotation speed of the blade of the one of the rotary wings. That is, the first controller 76 controls the direction of movement of the unmanned aerial vehicle 70 by controlling the rotation speed of the plurality of blades such that the blade on the side to which the unmanned aerial vehicle 70 moves is lower than the rotation speed of the blade located on the opposite side of the unmanned aerial vehicle 70. Moreover, the first controller 76 causes the unmanned aerial vehicle 70 to hover by causing the plurality of blades to rotate at the same speed.

The unmanned aerial vehicle 70 may be an aerial vehicle that is operated by using a remote control or may be an aerial vehicle that autonomously flies, and is not limited.

Figure 8A:
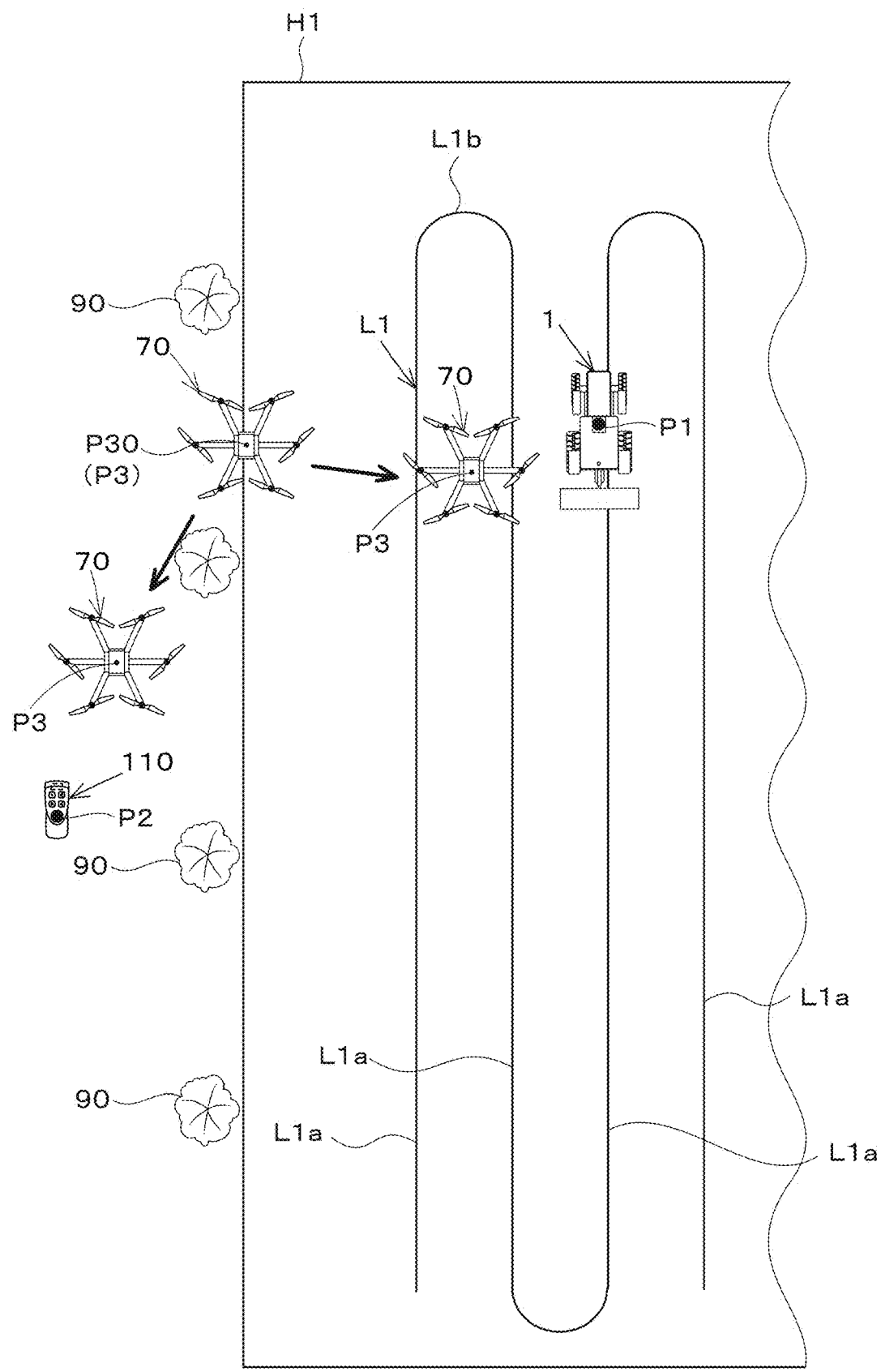
FIG. 8A is a plan view illustrating a state in which an unmanned aerial vehicle is flying in coordination (cooperation) with the tractor.

As illustrated in FIG. 8A, the unmanned aerial vehicle 70 can fly in coordination (cooperation) with the tractor 1. FIG. 8A is a plan view illustrating the manner in which the unmanned aerial vehicle 70 is flying in coordination with the tractor 1. To be specific, when the tractor 1 is automatically traveling, the unmanned aerial vehicle 70 flies in the vicinity of the tractor 1, in the vicinity of the agricultural field H1, and/or the like. The unmanned aerial vehicle 70 relays information exchanged between the information terminal 110 and the tractor 1. For example, the first communicator 75 of the unmanned aerial vehicle 70 receives the first information, such as an instruction for the tractor 1 to start automatic travel or stop automatic travel, transmitted from the information terminal 110, and transmits the received first information (an instruction for the tractor 1 to start automatic travel or stop automatic travel) to the second communicator 51 of the tractor 1. That is, the first communicator 75 temporarily holds the received first information, and thereafter transmits (relays) the held first information to the second communicator 51.

The first communicator 75 of the unmanned aerial vehicle 70 receives the second information (continuance of automatic travel or stopping of the automatic travel of the tractor 1) transmitted from the second communicator 51 of the tractor 1, and transmits the received second information (continuance of automatic travel or stopping of the automatic travel of the tractor 1) to the information terminal 110. That is, the first communicator 75 temporarily holds the received second information, and thereafter transmits (relays) the held second information to the information terminal 110.

The unmanned aerial vehicle 70 flies so that the unmanned aerial vehicle 70 can relay information exchanged between the information terminal 110 and the tractor 1.

To be more specific, the first communicator 75 of the unmanned aerial vehicle 70 monitors the first received signal strength of the first information transmitted from the information terminal 110 and the second received signal strength of the second information transmitted from the second communicator 51 of the tractor 1. As illustrated in FIG. 8A, if the first received signal strength is lower than the second received signal strength and the first received signal strength is lower than a threshold, the first controller 76 causes the unmanned aerial vehicle 70 to fly from the present position P30 toward the information terminal 110. On the other hand, if the second received signal strength is lower than the first received signal strength and the second received signal strength is lower than the threshold, the first controller 76 causes the unmanned aerial vehicle 70 to fly from the present position P30 toward the tractor 1. As the method of determining the first received signal strength and the second received signal strength, existing technology such as RSSI (Received signal strength indication) or the like can be used. The aforementioned threshold is a value stored beforehand in the first controller 76 and may be changed to any appropriate value by operating a terminal (for example, the information terminal 110) that is communicationally connected to the first communicator 75.

In the present preferred embodiment, when the unmanned aerial vehicle 70 flies toward the information terminal 110 or flies toward the tractor 1, the unmanned aerial vehicle 70 (the first controller 76) determines the position of the information terminal 110 or the tractor 1 based on the terminal position P2 detected by the positioning device 113 of the information terminal 110 or the travel position P1 detected by the second position detector 30. The method by which the unmanned aerial vehicle 70 determines the position of the information terminal 110 or the tractor 1 is an example, and is not limited to this. For example, the unmanned aerial vehicle 70 may determine the position of the information terminal 110 or the tractor 1 by sensing the information terminal 110 and the tractor 1 from above by using the sensor 72.

Figure 9A:
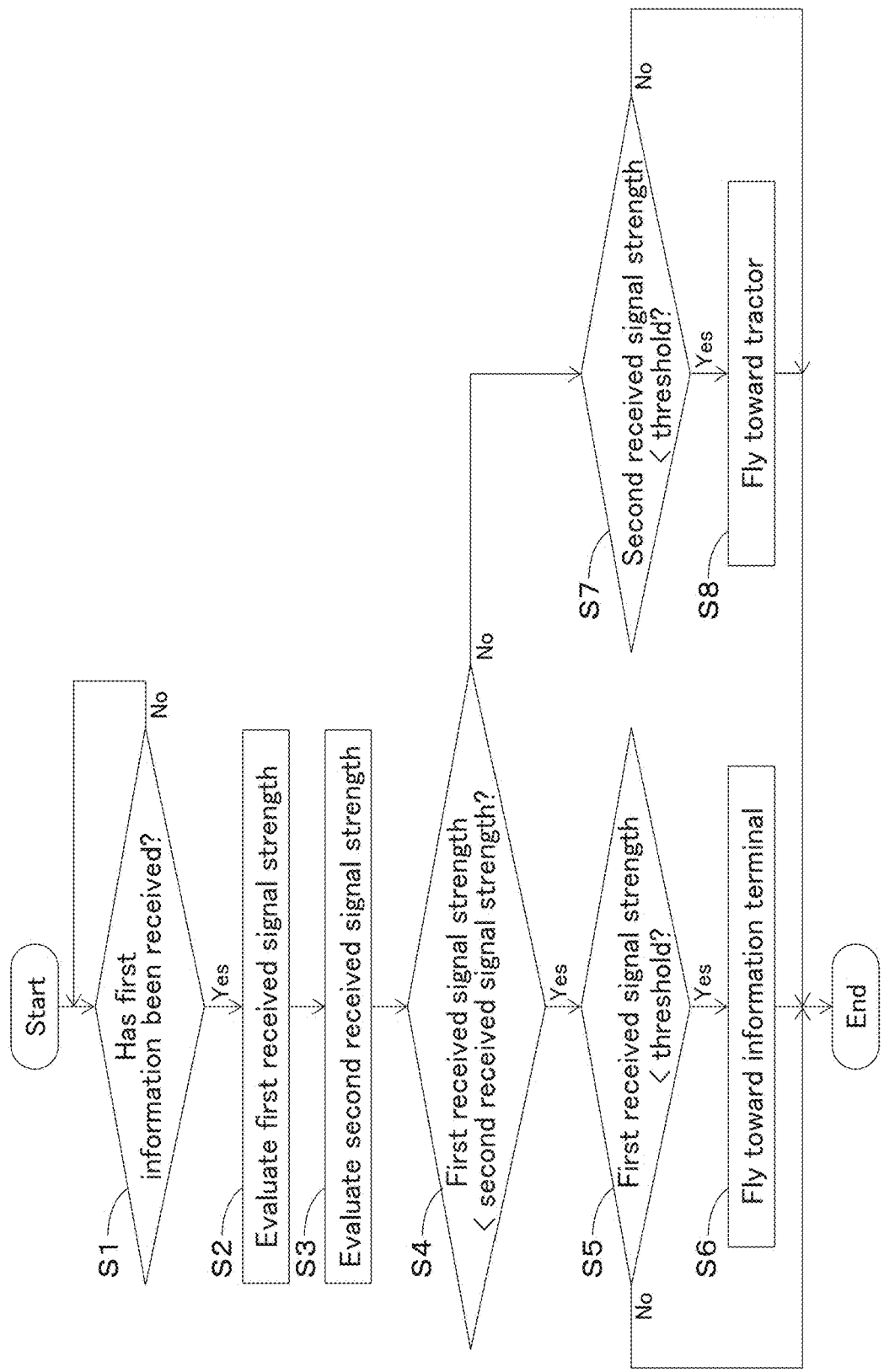
FIG. 9A is a flowchart of a process through which the unmanned aerial vehicle relays information communication between an information terminal and the tractor.

The following description discusses a process by which the unmanned aerial vehicle 70 flies such that the unmanned aerial vehicle 70 can relay information exchanged between the information terminal 110 and the tractor 1 with reference to FIG. 9A. FIG. 9A is a flowchart of the process by which the unmanned aerial vehicle 70 relays information exchanged between the information terminal 110 and the tractor 1.

First, the first controller 76 determines whether or not the first communicator 75 has received the first information (S1). If the first controller 76 determines that the first communicator 75 has received the first information (S1. Yes), the first controller 76 evaluates the received signal strength (first received signal strength) of the first information received by the first communicator 75 (S2).

After evaluating the first received signal strength (S2), the first controller 76 evaluates the received signal strength (second received signal strength) of the second information received by the first communicator 75 (S3). After evaluating the second received signal strength (S3), the first controller 76 determines whether or not the first received signal strength evaluated in S2 is lower than the second received signal strength evaluated in S3 (S4).

If the first controller 76 determines that first received signal strength is lower than the second received signal strength (S4, Yes), the first controller 76 determines whether or not the first received signal strength is lower than a threshold (S5).

If the first controller 76 determines that the first received signal strength is lower than a threshold (S5, Yes), the first controller 76 causes the unmanned aerial vehicle 70 to fly from the present position P30 toward the information terminal 110 (S6) based on the flight position P3 detected by the first position detector 73 and the terminal position P2 detected by the positioning device 113. To be specific, the first controller 76 causes the unmanned aerial vehicle 70 to fly so that the flight position P3 detected by the first position detector 73 approaches the terminal position P2 detected by the positioning device 113.

If the first controller 76 determines that the first received signal strength is higher than the second received signal strength (S4, No), the first controller 76 determines whether or not the second received signal strength is lower than the threshold (S7).

If the first controller 76 determines that the second received signal strength is lower than the threshold (S7, Yes), the first controller 76 causes the unmanned aerial vehicle 70 to fly from the present position P30 toward the tractor 1 (S8) based on the flight position P3 detected by the first position detector 73 and the travel position P1 detected by the second position detector 30. To be specific, the first controller 76 causes the unmanned aerial vehicle 70 to fly so that the flight position P3 detected by the first position detector 73 approaches the travel position P1 detected by the second position detector 30.

If the first controller 76 determines that the first received signal strength is not lower than the threshold in S5 (S5, No) or that the second received signal strength is not lower than the threshold in S7 (S7, No), the first controller 76 stops the process, returns to START, and restarts the process.

As illustrated in FIG. 8B, the first controller 76 may increase the altitude of the unmanned aerial vehicle 70 if the first received signal strength is lower than the second received signal strength and the first received signal strength is lower than the threshold or if the second received signal strength is lower than the first received signal strength and the second received signal strength is lower than the threshold. FIG. 9B is a flowchart of a process by which the unmanned aerial vehicle 70 relays information exchanged between the information terminal 110 and the tractor 1 in the first variation illustrated in 8B. As shown in FIG. 9B, the first variation is different in that step S6A is performed instead of S6 and step S8A is performed instead of S8. Therefore, descriptions of S1 to S4 will be omitted in the first variation.

That is, in the first variation, if the first controller 76 determines that the first received signal strength is lower than the threshold (S5, Yes), the first controller 76 raises the flight position P3 from the present position P30 based on the flight position P3 detected by the first position detector 73 (S6A). If the first controller 76 determines that the second received signal strength is lower than the threshold (S7, Yes), the first controller 76 raises the flight position P3 from the present position P30 based on the flight position P3 detected by the first position detector 73 (S8A). With this, the unmanned aerial vehicle 70 ascends to a position higher than the obstacle 90, and therefore the unmanned aerial vehicle 70 becomes able to receive the first information or the second information.

The first controller 76 may perform a process illustrated in FIG. 9C, which is a combination of the preferred embodiment and the variation described above. FIG. 9C is a flowchart of the process by which the unmanned aerial vehicle 70 relays information exchanged between the information terminal 110 and the tractor 1 in a second variation. As shown in FIG. 9C, the second variation is different in that step S6B is performed instead of S6 and S6A and step S8B is performed instead of S8 and S8A. Therefore, descriptions of S1 to S4 will be omitted in the second variation.

That is, in the second variation, if the first controller 76 determines that the first received signal strength is lower than the threshold (S5, Yes), the first controller 76 raises the flight position P3 from the present position P30 (S6B) while causing the unmanned aerial vehicle 70 to fly from the present position P30 toward the information terminal 110 (S6B). In the present variation, if the first controller 76 determines that the second received signal strength is lower than the threshold (S7, Yes), the first controller 76 raises the flight position P3 from the present position P30 while causing the unmanned aerial vehicle 70 to fly from the present position P30 toward the tractor 1 (S8B).

As described above, the unmanned aerial vehicle 70 moves to a position that allows the unmanned aerial vehicle 70 to transmit and receive the first information or the second information. In the preferred embodiment described above, communication is made easier by causing the unmanned aerial vehicle 70 to fly toward the information terminal 110 or the tractor 1 or by changing the altitude. However, both of flying toward the information terminal 110 or the tractor 1 and changing of the altitude may be performed.

The information terminal 110 is a terminal that transmits an instruction for the tractor 1 to start automatic travel or stop automatic travel. However, the information terminal 110 is not limited to this, and may be any terminal that receives information of various types related to the tractor 1 (operation information, the travel position P1, and/or the like) or issues commands other than automatic travel to the tractor 1.

A communication system for an agricultural machine includes an information terminal 110 to transmit first information to an agricultural machine (tractor 1), a first communicator 75 provided in or on an unmanned aerial vehicle 70 to receive the first information transmitted from the information terminal 110, and a second communicator 51 provided in or on the agricultural machine (tractor 1) to receive the first information transmitted from the first communicator 75. With this, it is possible to cause the unmanned aerial vehicle 70 to function as a wireless relay station and to improve communication between the agricultural machine (tractor 1) and the information terminal 110, because, after the first communicator 75 of the unmanned aerial vehicle 70 has received the first information transmitted from the information terminal 110, the first information is transmitted to the second communicator 51 of the agricultural machine (tractor 1).

The second communicator 51 may be operable to transmit second information about the agricultural machine (tractor 1) to the first communicator 75. The first communicator 75 may be operable to transmit the second information to the information terminal 110. With this, it is also possible to transmit the second information, transmitted from agricultural machine (tractor 1), to the information terminal 110 via the unmanned aerial vehicle 70.

The unmanned aerial vehicle 70 may be operable to move to a position that allows the unmanned aerial vehicle 70 to transmit and receive the first information or the second information. With this, it is possible for the unmanned aerial vehicle 70 to receive the first information and/or the second information because the unmanned aerial vehicle 70 moves, even if an obstacle 90 such as a building, a utility pole, or a tree is present between the information terminal 110 and the agricultural machine (tractor 1).

The unmanned aerial vehicle 70 may be operable to move to a position that allows the unmanned aerial vehicle 70 to transmit and receive the first information or the second information, based on a first received signal strength of the first information transmitted from the information terminal 110 and a second received signal strength of the second information transmitted from the second communicator 51. With this, it is possible to move the unmanned aerial vehicle 70 to a position that allows the unmanned aerial vehicle 70 to easily perform information exchange based on the received signal strength (first received signal strength, second received signal strength).

The information terminal 110 may be operable to transmit, as the first information, information including instructing the agricultural machine (tractor 1) to start traveling or instructing agricultural machine (tractor 1) to stop traveling. With this, it is possible to reliably start travel or stop travel of the agricultural machine (tractor 1) by using the first information transmitted from the information terminal 110.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A communication system for an agricultural machine, the communication system comprising:
    an information terminal to transmit first information to an agricultural machine;
    a first communicator provided in or on an unmanned aerial vehicle to receive the first information transmitted from the information terminal; and
    a second communicator provided in or on the agricultural machine to receive the first information transmitted from the first communicator; wherein
    the second communicator transmits second information about the agricultural machine to the first communicator;
    the first communicator transmits the second information to the information terminal; and
    the unmanned aerial vehicle moves to a position where the unmanned aerial vehicle is allowed to transmit and receive the first information or the second information.

2. The communication system according to claim 1, wherein the information terminal transmits, as the first information, information including instructing the agricultural machine to start traveling or instructing the agricultural machine to stop traveling.

3. The communication system according to claim 1, wherein the unmanned aerial vehicle moves upward from a present position thereof when the first received signal strength is lower than the second received signal strength and is lower than a threshold.

4. A communication system for an agricultural machine, the communication system comprising:
    an information terminal to transmit first information to an agricultural machine;
    a first communicator provided in or on an unmanned aerial vehicle to receive the first information transmitted from the information terminal; and
    a second communicator provided in or on the agricultural machine to receive the first information transmitted from the first communicator; wherein
    the second communicator transmits second information about the agricultural machine to the first communicator;
    the first communicator transmits the second information to the information terminal; and
    the unmanned aerial vehicle moves to a position where the unmanned aerial vehicle is allowed to transmit and receive the first information or the second information, based on a first received signal strength of the first information transmitted from the information terminal and a second received signal strength of the second information transmitted from the second communicator.

5. The communication system according to claim 4, wherein the information terminal transmits, as the first information, information including instructing the agricultural machine to start traveling or instructing the agricultural machine to stop traveling.

6. The communication system according to claim 4, wherein the unmanned aerial vehicle moves from a present position thereof toward the information terminal when the first received signal strength is lower than the second received signal strength and is lower than a threshold.

7. The communication system according to claim 4, wherein the unmanned aerial vehicle moves from a present position thereof toward the agricultural machine when the second received signal strength is lower than the first received signal strength and is lower than a threshold.

8. The communication system according to claim 4, wherein the unmanned aerial vehicle moves upward from a present position thereof when the second received signal strength is lower than the first received signal strength and is lower than a threshold.

* * * * *